United States Patent
Coulter et al.

(10) Patent No.: US 12,307,144 B1
(45) Date of Patent: May 20, 2025

(54) PRINT FILE PREPROCESSING MECHANISM

(71) Applicants: Justin Coulter, Boulder, CO (US); David Ward, Boulder, CO (US)

(72) Inventors: Justin Coulter, Boulder, CO (US); David Ward, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/507,442

(22) Filed: Nov. 13, 2023

(51) Int. Cl.
*G06F 3/12* (2006.01)
*G06K 15/02* (2006.01)

(52) U.S. Cl.
CPC ............ *G06F 3/1264* (2013.01); *G06F 3/124* (2013.01)

(58) Field of Classification Search
None
See application file for complete search history.

(56) References Cited

U.S. PATENT DOCUMENTS

| | | | |
|---|---|---|---|
| 6,259,821 B1 * | 7/2001 | Branciforte | G06T 11/60 382/258 |
| 6,912,066 B2 | 6/2005 | Takagi | |
| 7,046,403 B1 * | 5/2006 | Yhann | H04N 1/58 382/253 |
| 7,142,316 B2 | 11/2006 | Roylance et al. | |
| 7,200,268 B2 | 4/2007 | Ishizuka et al. | |
| 7,236,268 B2 | 6/2007 | Rao et al. | |
| 7,986,419 B2 | 7/2011 | Mazur | |
| 8,107,091 B2 | 1/2012 | Han | |
| 8,259,368 B2 | 9/2012 | Otake | |
| 8,331,683 B2 | 12/2012 | Oishi | |
| 8,355,167 B2 | 1/2013 | Chapman et al. | |
| 8,467,089 B2 | 6/2013 | Loce et al. | |
| 8,605,326 B2 | 12/2013 | Yomogisawa | |
| 8,634,107 B2 | 1/2014 | Nakamura | |
| 8,693,045 B2 | 4/2014 | Kubota et al. | |
| 8,743,424 B2 | 6/2014 | Shaham et al. | |
| 8,891,115 B2 | 11/2014 | Sweet et al. | |
| 8,928,930 B2 | 1/2015 | Jo et al. | |
| 9,241,090 B2 | 1/2016 | Mita | |
| 9,262,703 B2 | 2/2016 | Kurose | |
| 9,538,020 B2 | 1/2017 | Yasinover et al. | |
| 9,753,677 B2 | 9/2017 | Cogan et al. | |
| 9,779,064 B2 | 10/2017 | Belbin et al. | |
| 9,898,692 B2 | 2/2018 | Wakai | |

(Continued)

FOREIGN PATENT DOCUMENTS

| | | | | |
|---|---|---|---|---|
| EP | 2966596 A1 | 1/2016 | | |
| JP | H1035042 | * | 2/1998 | ............... B41J 5/30 |

(Continued)

*Primary Examiner* — Beniyam Menberu

(74) *Attorney, Agent, or Firm* — Jaffery Watson Hamilton & DeSanctis LLP

(57) ABSTRACT

A system is disclosed. The system includes one or more processors to receive a print job file including page content data, traverse each of a plurality of subset ranges of the page content data to generate page element metadata based on the page content data, wherein the page element metadata comprises identified page elements and the logical pages that correspond to the identified page elements, aggregate the page element metadata to generate print job structure metadata and store the print job structure metadata, wherein the print job structure metadata is stored separately from the print job file.

23 Claims, 15 Drawing Sheets

(56) References Cited

U.S. PATENT DOCUMENTS

| | | |
|---|---|---|
| 9,973,651 B2 | 5/2018 | Mita |
| 10,068,163 B2 | 9/2018 | Torii et al. |
| 10,395,399 B2 | 8/2019 | Gnutzmann |
| 10,872,279 B2 | 12/2020 | Tsuchiya et al. |
| 10,901,669 B2 | 1/2021 | Kahwaji et al. |
| 11,017,276 B2 | 5/2021 | Mochizuki et al. |
| 11,151,430 B2 | 10/2021 | Kimura et al. |
| 12,175,140 B1* | 12/2024 | Bhatt ................... G06F 3/122 |
| 2003/0218777 A1* | 11/2003 | Severens ................ H04N 1/46 382/173 |
| 2005/0094191 A1* | 5/2005 | Vondran, Jr. ............ G06F 3/124 358/1.15 |
| 2005/0122337 A1* | 6/2005 | Chen ..................... G06T 11/40 345/545 |
| 2005/0262134 A1* | 11/2005 | Sedky .................. G06F 3/1244 |
| 2007/0002348 A1 | 1/2007 | Hagiwara |
| 2008/0037047 A1* | 2/2008 | Condon ............... G06F 40/103 358/1.13 |
| 2008/0133560 A1* | 6/2008 | Ferlitsch ............ H04N 1/00344 |
| 2008/0276251 A1* | 11/2008 | Morales ................. G06F 9/44 719/315 |
| 2008/0285074 A1* | 11/2008 | Wilson ................ G06F 40/186 358/1.15 |
| 2009/0033999 A1* | 2/2009 | Nishiyama ........... G06T 11/203 358/1.18 |
| 2009/0122076 A1 | 5/2009 | Zhong et al. |
| 2011/0170132 A1* | 7/2011 | Mori ................... G06F 3/1284 358/1.15 |
| 2011/0181913 A1* | 7/2011 | Yoshimura ........... G06F 3/1205 358/1.15 |
| 2012/0081720 A1* | 4/2012 | Pandit .................. G06F 3/1219 358/1.9 |
| 2012/0162707 A1* | 6/2012 | Takenaka ........... G06K 15/1857 358/1.15 |
| 2013/0342858 A1* | 12/2013 | Abel .................... H04N 1/233 358/1.9 |
| 2015/0254032 A1 | 9/2015 | Sugahara |
| 2017/0109329 A1* | 4/2017 | Wyatt .................... G06T 11/60 |
| 2018/0136889 A1* | 5/2018 | Ward ................... G06F 3/1256 |
| 2019/0122043 A1* | 4/2019 | Bala .................... G06V 30/416 |
| 2020/0285430 A1* | 9/2020 | Coulter ................ G06F 3/1259 |

FOREIGN PATENT DOCUMENTS

| | | | |
|---|---|---|---|
| JP | 2009224845 | * 10/2009 | ............... H04N 1/00 |
| JP | 5247394 B2 | 7/2013 | |
| JP | 5488298 B2 | 5/2014 | |
| JP | 2011160013 A | 5/2014 | |
| JP | 2014184597 A | 10/2014 | |
| JP | 2015085563 A | 5/2015 | |
| JP | 2015153104 A | 8/2015 | |
| JP | 5819698 B2 | 11/2015 | |
| JP | 6142890 B2 | 6/2017 | |
| JP | 2015066936 A | 8/2017 | |
| JP | 2015015589 A | 9/2017 | |
| JP | 2017154313 A | 9/2017 | |
| JP | 6236971 B2 | 11/2017 | |
| JP | 6350091 B2 | 7/2018 | |
| JP | 6406085 B2 | 10/2018 | |
| JP | 6413400 B2 | 10/2018 | |
| JP | 6442950 B2 | 12/2018 | |
| JP | 2019025801 A | 2/2019 | |
| JP | 2019093559 | * 6/2019 | ............. B41J 29/42 |
| JP | 2019093559 A | 6/2019 | |
| JP | 2019105767 A | 6/2019 | |
| JP | 6671188 B2 | 3/2020 | |
| JP | 6753317 B2 | 9/2020 | |
| JP | 6840884 B2 | 3/2021 | |
| JP | 6946771 B2 | 10/2021 | |
| JP | 2022105413 A | 7/2022 | |
| JP | 7123737 B2 | 8/2022 | |
| JP | 2022157949 A | 10/2022 | |
| JP | 7187300 B2 | 12/2022 | |
| JP | 7282530 B2 | 5/2023 | |
| JP | 2023065186 A | 5/2023 | |
| JP | 2023071277 A | 5/2023 | |
| JP | 2021104650 A | 10/2023 | |

* cited by examiner

PRINT FILE PREPROCESSING MECHANISM

FIELD OF THE INVENTION

The invention relates to the field of image reproduction, and in particular, to image processing in a printing system.

BACKGROUND

In a variety of document presentation systems such as printing systems, it is common to process (e.g., interpret and rasterize) print data to generate a bitmap representation of each sheetside image of the document by processing a sequence of data objects. The data objects (or elements) are typically included in a print job that is defined in a page description language (PDL) or other suitable encoding that are, at some point prior to writing to a bitmap, represented as regions of rectangles of pixels. Poorly structured or complex print job files may cause a print system to undesirably pause printing due to the print controller being unable to process the print job fast enough to produce sufficient data stream to allow the print engine to maintain the intended print output speed.

SUMMARY

In one embodiment, a system is disclosed. The system includes one or more processors to receive a print job file including page content data, traverse each of a plurality of subset ranges of the page content data to generate page element metadata based on the page content data, wherein the page element metadata comprises identified page elements and the logical pages that correspond to the identified page elements, aggregate the page element metadata to generate print job structure metadata and store the print job structure metadata, wherein the print job structure metadata is stored separately from the print job file.

BRIEF DESCRIPTION OF THE DRAWINGS

A better understanding of the present invention can be obtained from the following detailed description in conjunction with the following drawings, in which.

DETAILED DESCRIPTION

A print file pre-process traversal mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
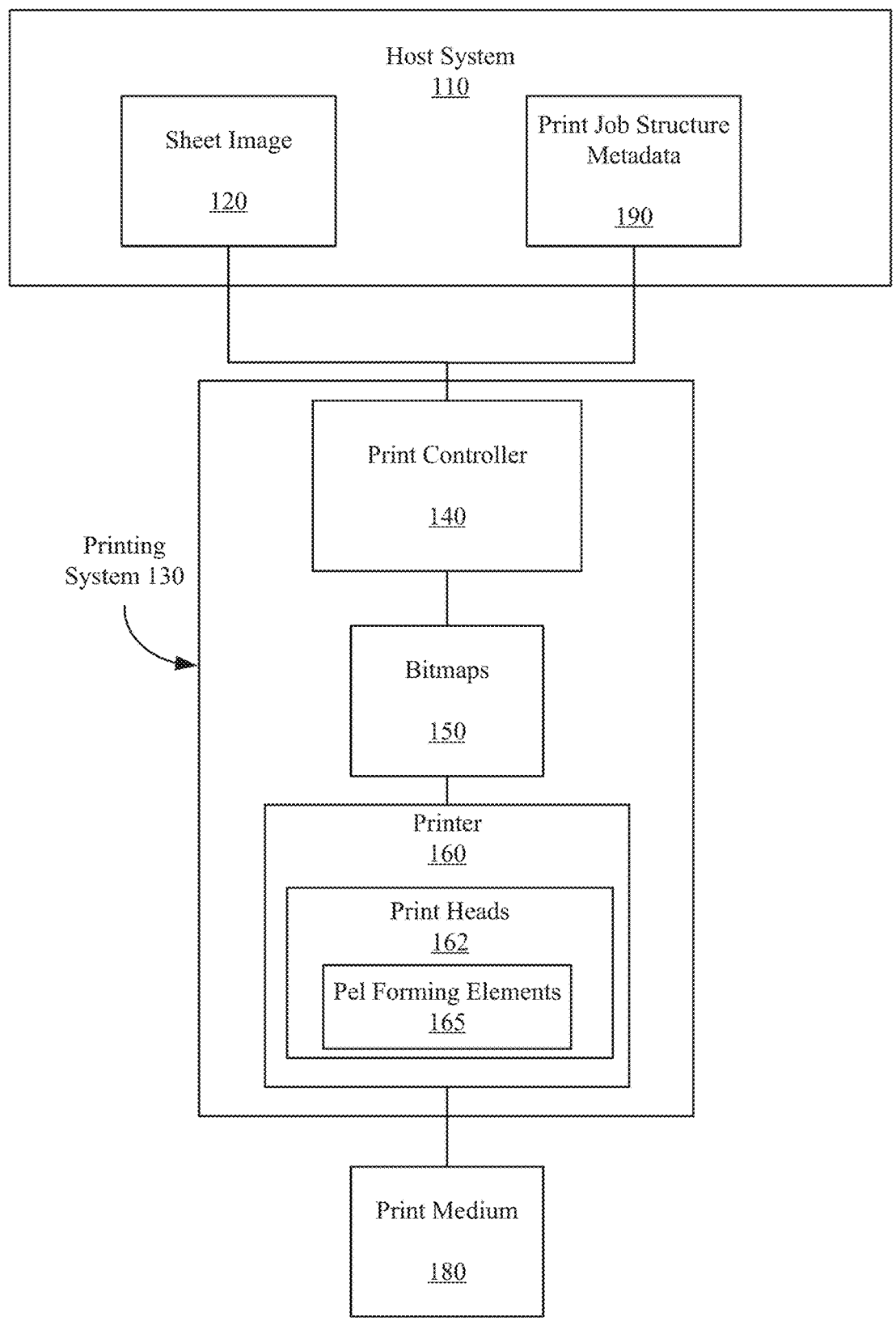
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., one or more print engines) using print job structure metadata 190. Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle).

According to one embodiment, pel forming elements may be grouped onto one or more printheads (e.g., printhead arrays). The pel forming elements 165 may be stationary (e.g., as part of a stationary printhead) or moving (e.g., as part of a printhead that moves across the print medium 180) as a matter of design choice. In a further embodiment, pel forming elements 165 may be assigned to one of one or more color planes that correspond to types of marking materials (e.g., Cyan, Magenta, Yellow, and black (CMYK)). These types of marking materials may be referred to as primary colors.

Printer 160 may be a multi-pass printer (e.g., dual pass, 3 pass, 4 pass, etc.) wherein multiple sets of pel forming elements 165 print the same region of the print image on the print medium 180. In such an embodiment, the set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and black, (CMYK) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may be comprised of a print job file that include Portable Document Format (PDF) data, PostScript data, Printer Command Language (PCL) data, and/or any other printer language data. The print controller 140 processes the sheet image to generate a bitmap 150 for transmission to printer 160. Bitmap 150 may be a halftoned bitmap (e.g., a compensated halftone bit map generated from compensated halftones, or un-compensated halftone bit map generated from un-compensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
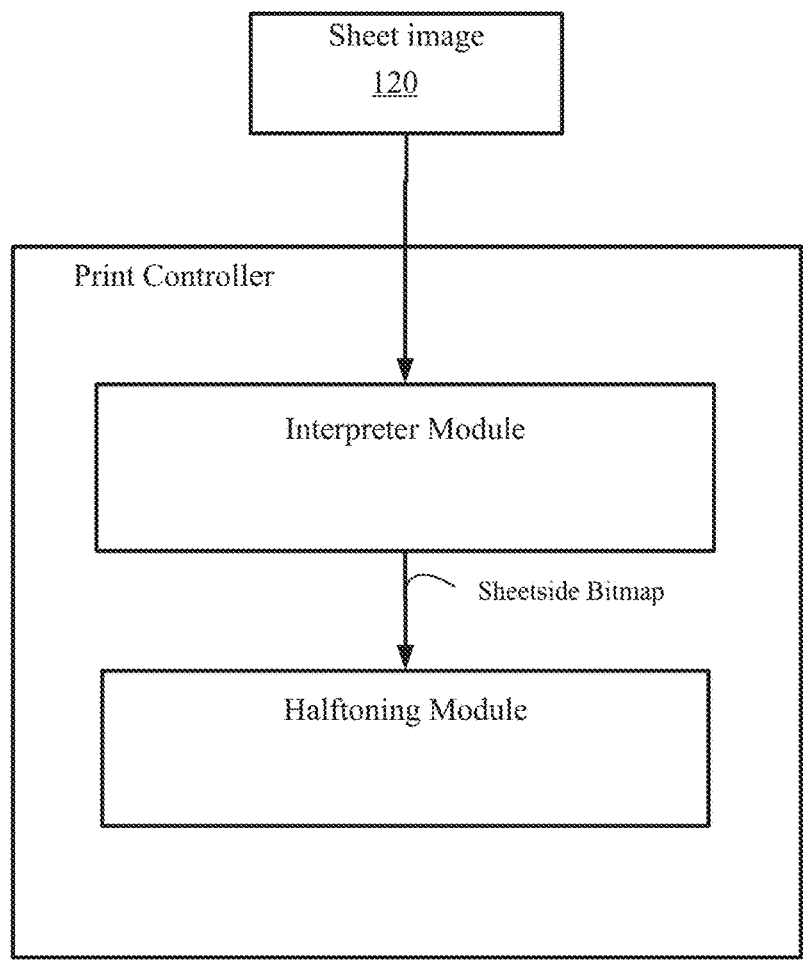
FIG. 2 illustrates a conventional print controller.

FIG. 2 illustrates a conventional print controller. The print controller includes an interpreter module operable to interpret, rasterize (e.g., render), or otherwise convert images (e.g., raw sheetside images such as sheet image 120) of a print job into sheetside bitmaps. The sheetside bitmaps generated by the interpreter module for each primary color are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image. The interpreter module is operable to interpret or rasterize multiple raw sheetsides concurrently so that the rate of rasterization substantially matches the rate of imaging of production print engines.

The halftoning module is operable to represent the sheetside bitmaps as halftone patterns of ink. For example, the halftoning module may convert the pels (also known as pixels) to halftone patterns of CMYK ink for application to the paper. A halftone design may comprise a pre-defined mapping of input pel gray levels to output drop sizes (e.g., instructed ink drop sizes transmitted to printheads) based on pel location.

In one embodiment, the halftone design may include a finite set of transition thresholds between a finite collection of successively larger drop sizes, beginning with zero and ending with a maximum drop size. The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

Processing poorly structured print job files using a conventional print controller typically results in extensive processing that may cause paused print output (e.g., printer clutching). For example, the interpreter module would be required to traverse the print job file during rasterization to perform various processes, such as determining and performing scan conversion of lines.

Figure 3A:
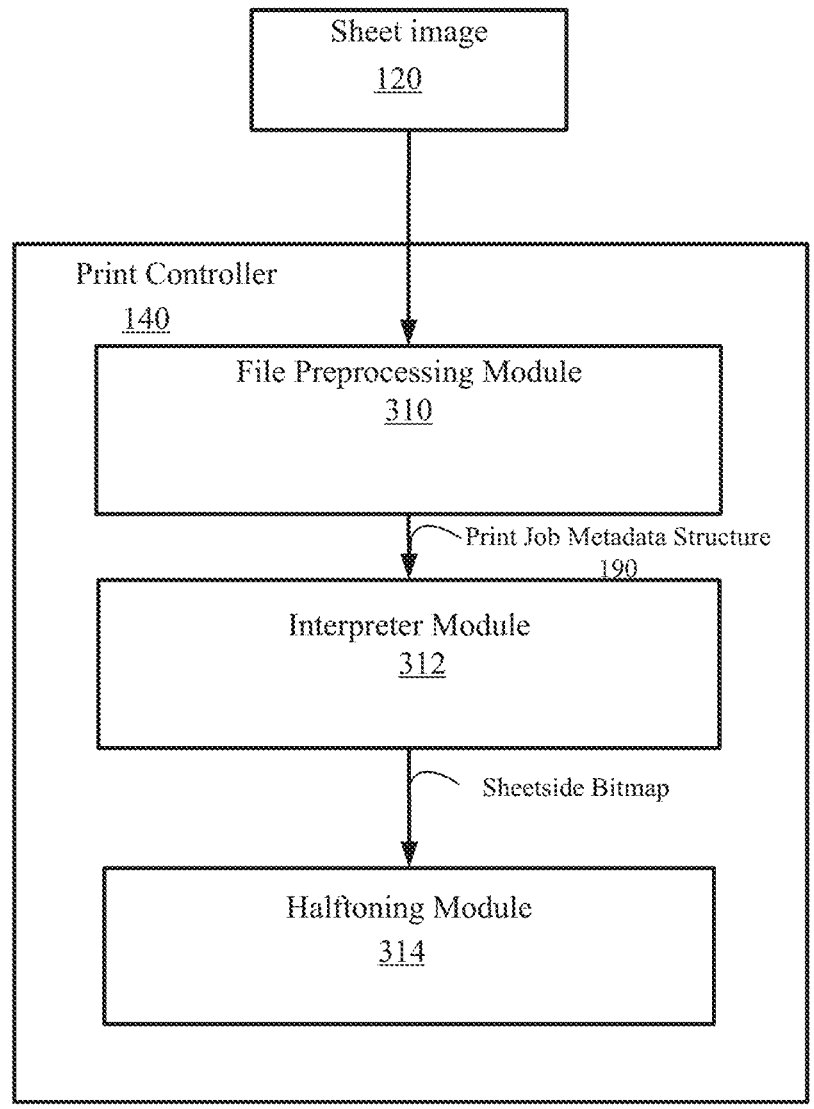
FIGS. 3A & 3B illustrate block diagrams of a print controller according to embodiments.
Figure 3B:
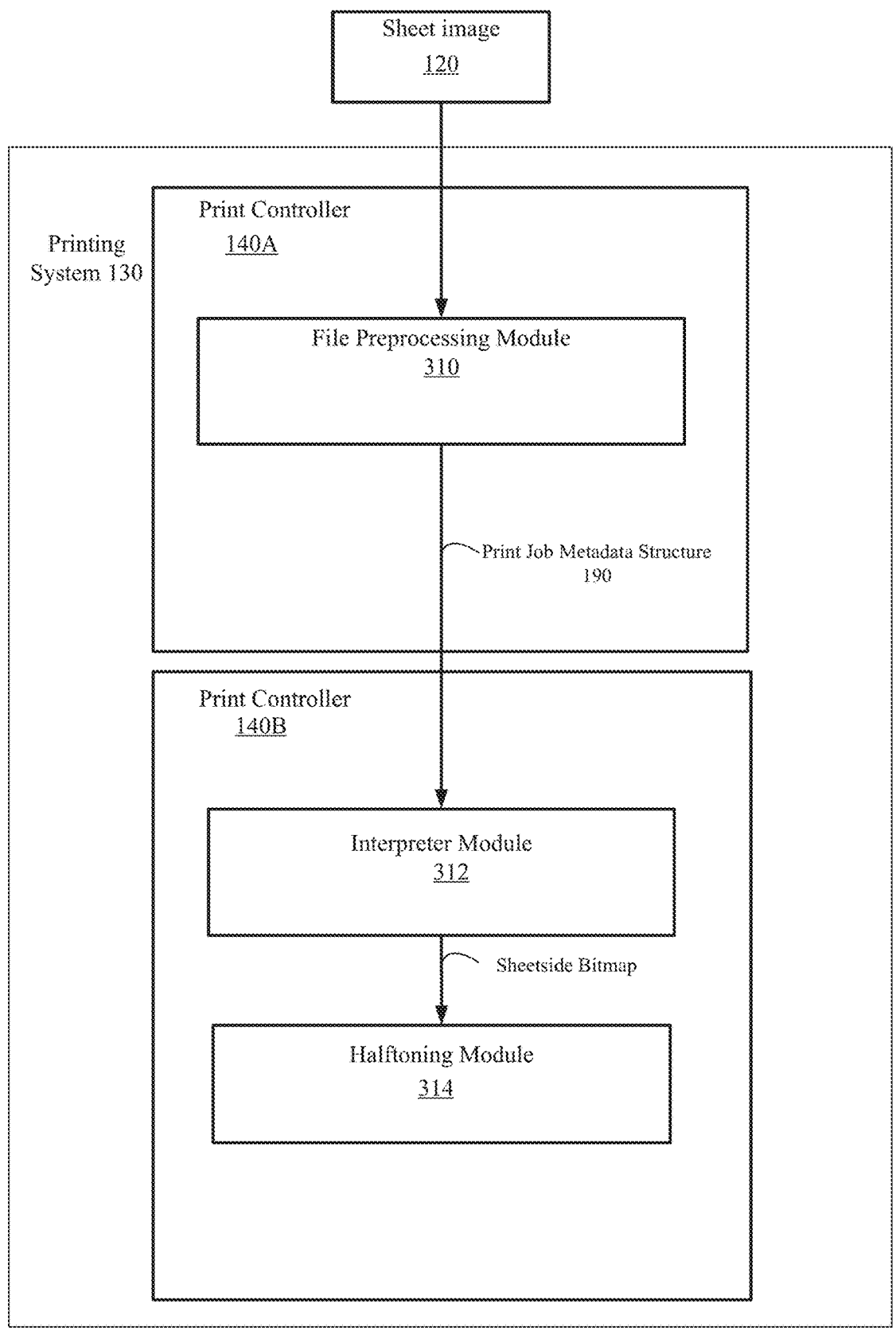

According to one embodiment, a print controller 140 is provided that includes a preprocess mechanism to traverse and perform a scan conversion analysis and detection prior to rasterizing a print job file. FIGS. 3A and 3B illustrate embodiments implementing such print controllers 140. FIG. 3A illustrates a print controller 140 (e.g., DFE or digital front end), in its generalized form, including a file preprocessing module 310, interpreter module 312 and halftoning module 314, while FIG. 3B illustrates an embodiment having print controllers 140A & 140B.

In the FIG. 3B embodiment, print controller 140A includes file preprocessing module 310 and print controller 140B includes interpreter module 312 and halftoning module 314. Print controllers 140A and 140B may be implemented in the same printing system 130 (as shown) or may be implemented separately. Interpreter module 312 and halftoning module 314 perform functions similar to those described above with reference to FIG. 2. However, file preprocessing module 310 is included to traverse received print job files in order to generate print job structure metadata 190 that is made available to aid performing efficient print processing (e.g., run time print processing or print time processing) for the printing of print job data at printing system 130.

Figure 3C:
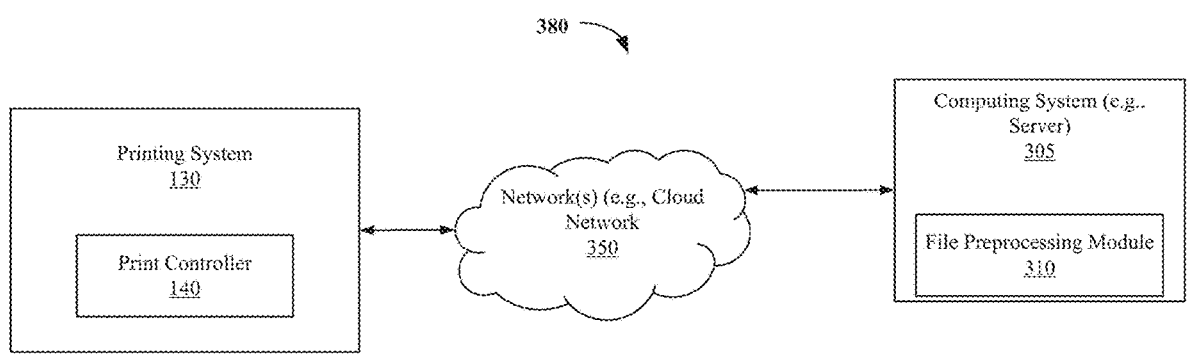
FIG. 3C illustrates an embodiment of a file preprocessing module implemented in a network.

Although shown as a component within a print controller 140, other embodiments may feature file preprocessing module 310 included within an independent device communicably coupled to print controller 140. For instance, FIG. 3C illustrates one embodiment of file preprocessing module 310 implemented in a network 380. As shown in FIG. 3C, file preprocessing module 310 is included within a computing system 305 and transmits data to printing system 130 via a cloud network 350.

Figure 4:
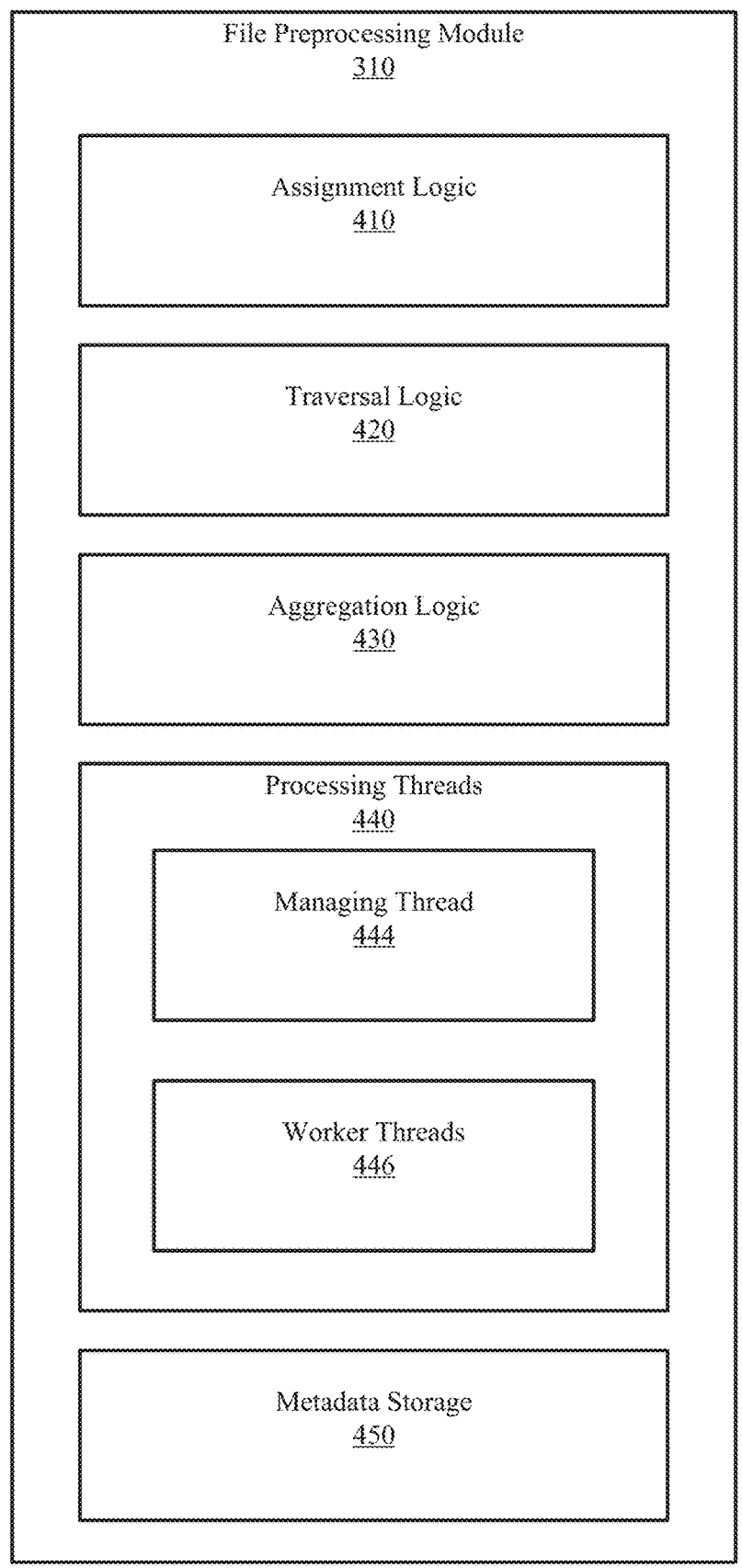
FIG. 4 illustrates one embodiment of a file preprocessing module.

FIG. 4 illustrates one embodiment of file preprocessing module 310. According to one embodiment, file preprocessing module 310 receives a print job file including page content data, traverse each of a plurality of subset ranges (e.g., sub ranges) of the page content data (or page elements) to generate page element metadata, aggregate page element metadata to generate print job structure metadata and store the print job structure metadata. In such an embodiment, the print job structure metadata is stored separately from the print job file. Page elements are print data objects that control line art and are associated with a page on which the processed line art would appear. Page elements appear as a sequence of operators and their operands in the print data file. In the PDF architecture, page elements are known as graphic objects and the specific type is path objects. A path object is an arbitrary shape made up of straight lines, rectangles and Bézier curves. Path objects end with one or more painting operators that specify whether the path is stroked, filled, used as a clipping boundary, or some combination of operations.

Generating the page element metadata comprises evaluating page elements within the page content data to identify associated logical pages of the print job file having markings instructed by the page elements. Generating the page element metadata further comprises determining properties of the page elements.

As shown in FIG. 4, file preprocessing module 310 includes assignment logic 410, traversal logic 420, aggregation logic 430, processing threads 440 and metadata storage 450. In one embodiment, assignment logic 410 implements a managing thread 444 within processing threads 440 to determine a quantity of worker threads 446 available to process a print job file, divides the print job file into a plurality of subset ranges based on the quantity of worker threads 446, and assigns each subset range to a worker thread 446. For example, a print job file may be divided into ten subset ranges upon a determination that ten worker threads 446 are available, with each subset range being assigned to a worker thread 446.

In a further embodiment, a subset range identifier (subset range ID) is assigned to each subset range of the print job file prior to being assigned to a corresponding worker thread 446 having a unique ID (e.g., worker #ID). For instance, a first subset range is assigned a first subset range ID (e.g., ID=0), which is then assigned to a first worker thread 446 (e.g., worker #0). The number of pages assigned to each worker thread 446 is determined by the total quantity of pages in the print job divided by the number of worker threads 446.

In one embodiment, the starting page for each worker is determined by multiplying subset range ID by the number of pages assigned to each worker. A technical benefit for determining the number of pages assigned to each worker thread 446 in this manner is that each worker thread 444 makes this determination as a part of their work and the managing thread 444 is not burdened with this computational task. As used herein, a processing thread comprises a sequence of instructions that may be executed independently by a processor (e.g., a central processing unit (CPU) or a graphics processing unit (GPU) to perform a process. Further, each processing thread may simultaneously execute tasks in parallel. Although described herein as worker threads, other embodiments may feature independent worker processes that may simultaneously execute tasks in parallel. A technical benefit for executing tasks in parallel using multiple threads or processes is to finish the pre-processing faster.

Figure 5:
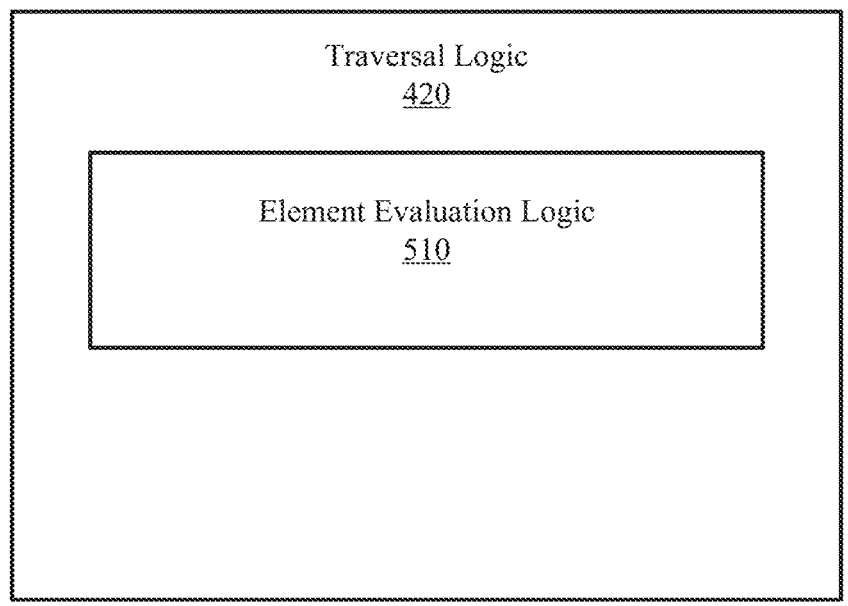
FIG. 5 illustrates one embodiment of traversal logic.

Traversal logic 420 implements the worker threads 446 to traverse each associated sub range to evaluate page elements within each page of a sub range. A sub range is a subset of the total pages that make up a print job. FIG. 5 illustrates one embodiment of traversal logic 420 including element evaluation logic 510. According to one embodiment, evaluation logic 510 causes each worker thread 446 to evaluate page elements on each page (e.g., logical page) included in the assigned sub range to determine the properties of the page elements. In such an embodiment, evaluating the page elements comprises determining the presence of fine lines (e.g., thin lines) based on properties of the page elements that determine line width.

In a further embodiment, determining the presence of fine lines comprises determining line attributes (e.g., determining line widths and a comparison of the determined line widths to one or more line width thresholds). In this embodiment, the line attributes determine whether a line qualifies for scan conversion, and if so, which scan conversion rule (e.g., over scan conversion rule or center scan conversion rule) is to be used. In yet a further embodiment, determining the presence of fine lines comprises determining whether a page element comprises a fill painting operator and if so, applying a clipping path intersection evaluation prior to performing the line width comparison.

As used herein, an over scan conversion rule considers any pixel whose square region intersects a shape as inside of the shape, regardless of how small the intersection, while a center scan conversion rule considers a pixel whose center point intersects the shape as being inside. Fine lines benefit from center scan conversion processing in that the fine lines will be rasterized intact. Fine lines do not benefit from over scan conversion processing as that tends to result in portions of the fine lines becoming enlarged which then abut neighboring lines or text with no separation after rasterization. However, over scan conversion processing can be performed faster than center scan conversion processing and so center scan conversion processing should only be used for pages that benefit from it resulting in increased overall print job processing efficiencies. In one embodiment, evaluation logic 510 generates page element metadata that is later used at interpreter 312 to determine which of the over scan or center scan rules, if any, to implement during rasterization based on a minimum line width and whether that minimum width was derived from a method of performing a fill painting operator plus the clipping path intersection to create an artificial fine line that could expose a limitation in rasterization. Accordingly, the evaluation process results in each worker thread 446 collecting line width information for each page in its processed sub range as specific page content data.

Referring back to FIG. 4, aggregation logic 430 implements managing thread 444 to receive the specific page content data from each worker thread 446 to generate print job structure metadata. In one embodiment, print job structure metadata identifies pages and comprises an aggregation of the page element metadata that is used at interpreter module 312 to enable/disable scan conversion, and if enabled, inform as to which scan conversion rule is to be used. In a further embodiment, aggregation logic 430 stores the print job structure metadata in metadata storage 450. In such an embodiment, the print job structure metadata is stored separately from the print job file.

Figure 6:
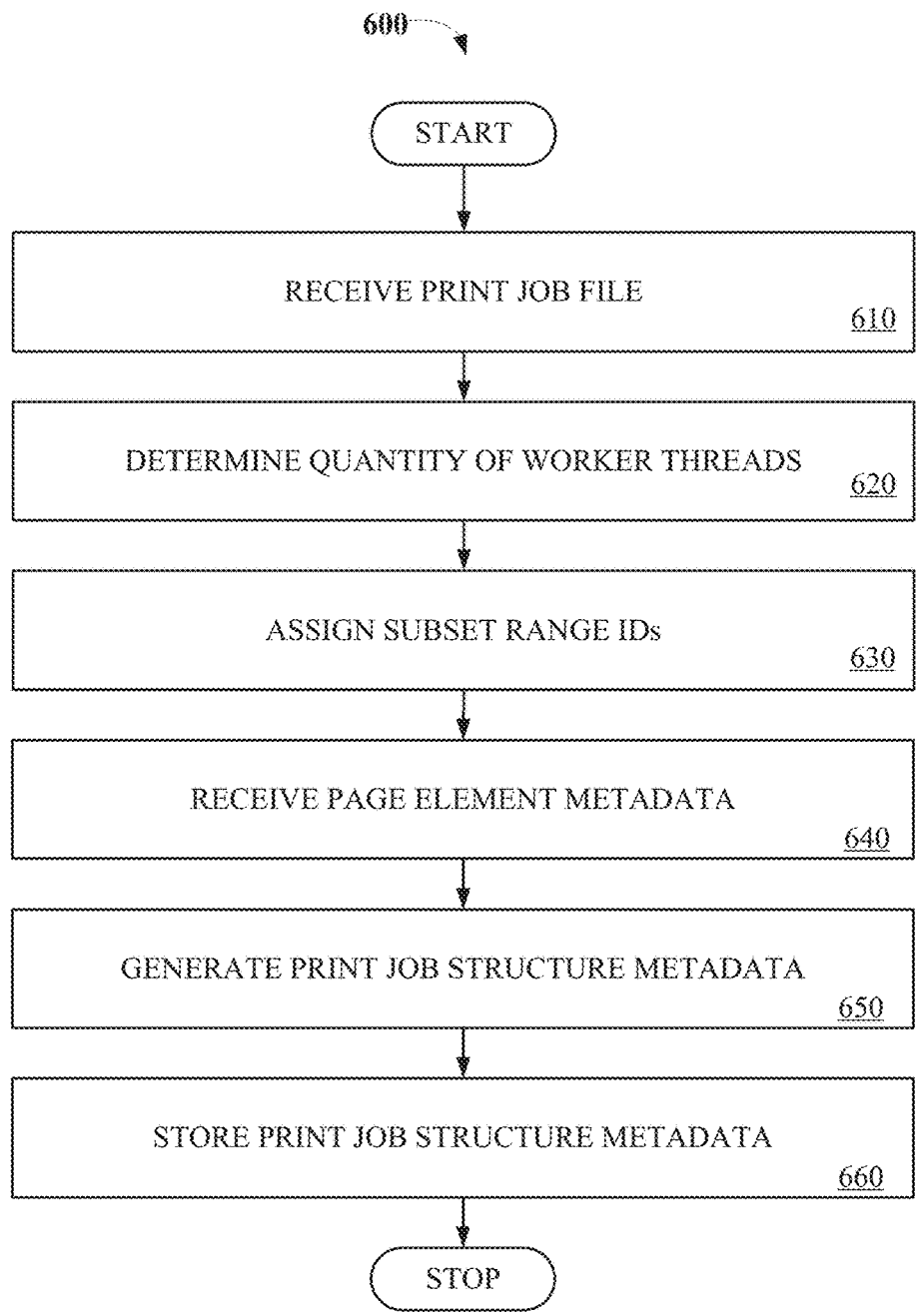
FIG. 6 is a flow diagram illustrating one embodiment a process performed by a file preprocessing module.

FIG. 6 is a flow diagram illustrating one embodiment of a process 600 for performing for file preprocessing management. Process 600 may be performed by processing logic that may include hardware (e.g., circuitry, dedicated logic, programmable logic, microcode, etc.), software such as instructions run on a processing device, or a combination thereof. In one embodiment, process 600 is performed by file preprocessing module via managing thread 444.

At processing block 610, a print job file (e.g., PDF file) is received. At processing block 620, the quantity of worker threads available to traverse the print job file is determined. At processing block 630, a subset range ID is assigned to each worker thread 444. At this point, each worker thread 444 is ready to perform a traversal operation on its assigned sub range of the print job file. A technical benefit for assigning each of the plurality of processing threads to each of the plurality of subset ranges is to finish the pre-processing faster.

Page element metadata is received once the traversal operation has been completed at each worker thread 444, at processing block 640. At processing block 650, the specific page content data is aggregated to generate print job structure metadata. At processing block 660, the print job structure metadata is stored (e.g., at metadata storage 450). A technical benefit of generating the print job structure metadata is that it is then available (e.g., transmitting to a print controller 140 or 140B) to aid in processing the corresponding print job file at print time. A suitable print controller may directly identify the page elements and corresponding pages from the print job structure metadata without the burden of traversing the corresponding print job that would otherwise be necessary.

Figure 7:
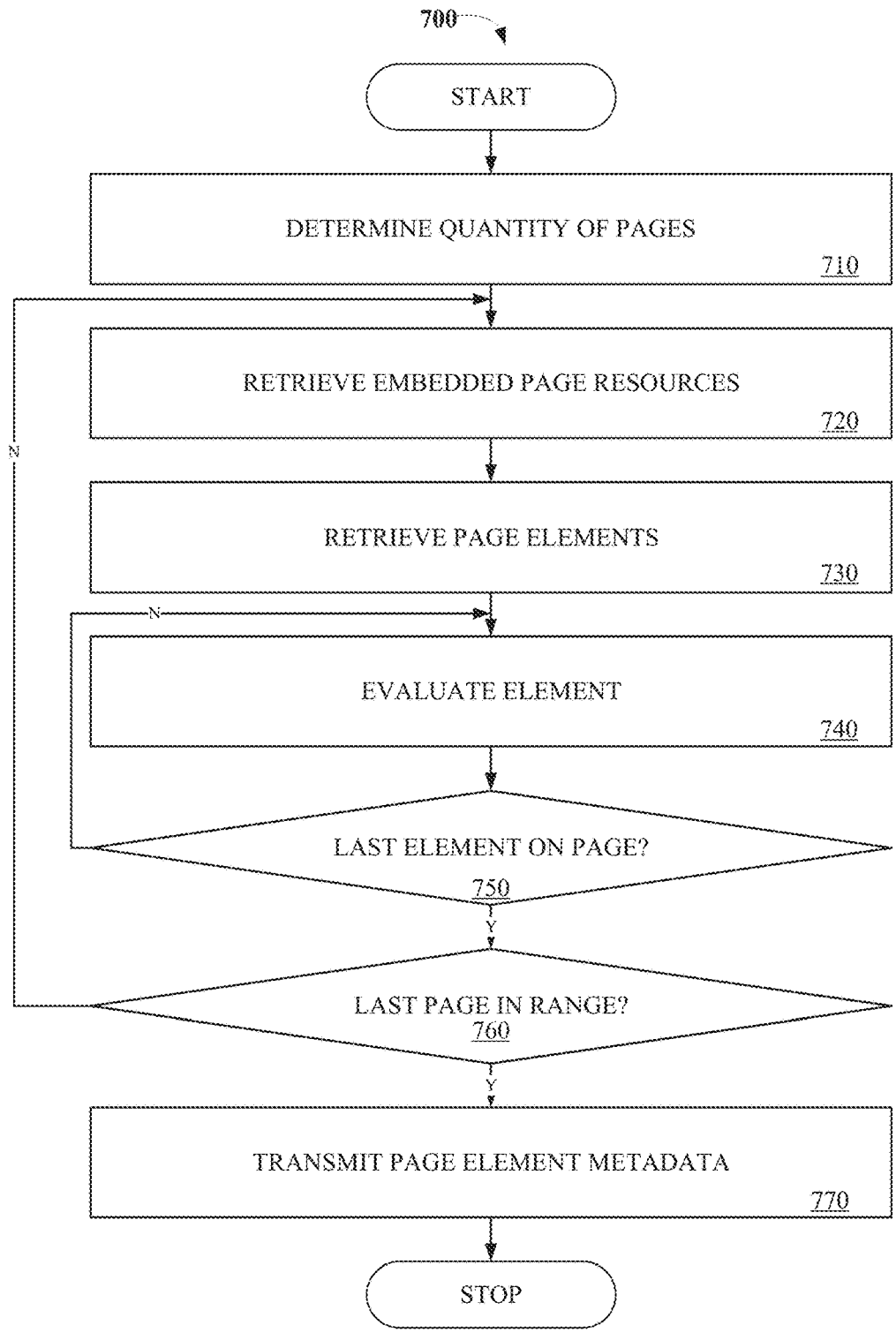
FIG. 7 is a flow diagram illustrating one embodiment a traversal process.

FIG. 7 is a flow diagram illustrating one embodiment of a traversal process 700. Process 700 may be performed by processing logic that may include hardware (e.g., circuitry, dedicated logic, programmable logic, microcode, etc.), software such as instructions run on a processing device, or a combination thereof. In one embodiment, process 700 is performed by traversal logic 420 at each worker thread 444.

At processing block 710, the quantity of pages in the print job file is determined and the subset range of pages for each worker thread 444 may be determined as explained above. At processing block 720, embedded page resources are retrieved for a page in the sub range being traversed. In one embodiment, the embedded page resources may comprise embedded input profiles, output profiles, a list of spot colors or fonts that are on each page, etc. At processing block 730, page content data (or page elements) is retrieved for the page. At processing block 740, each page element on the page is evaluated based on the embedded page resources.

Figure 8:
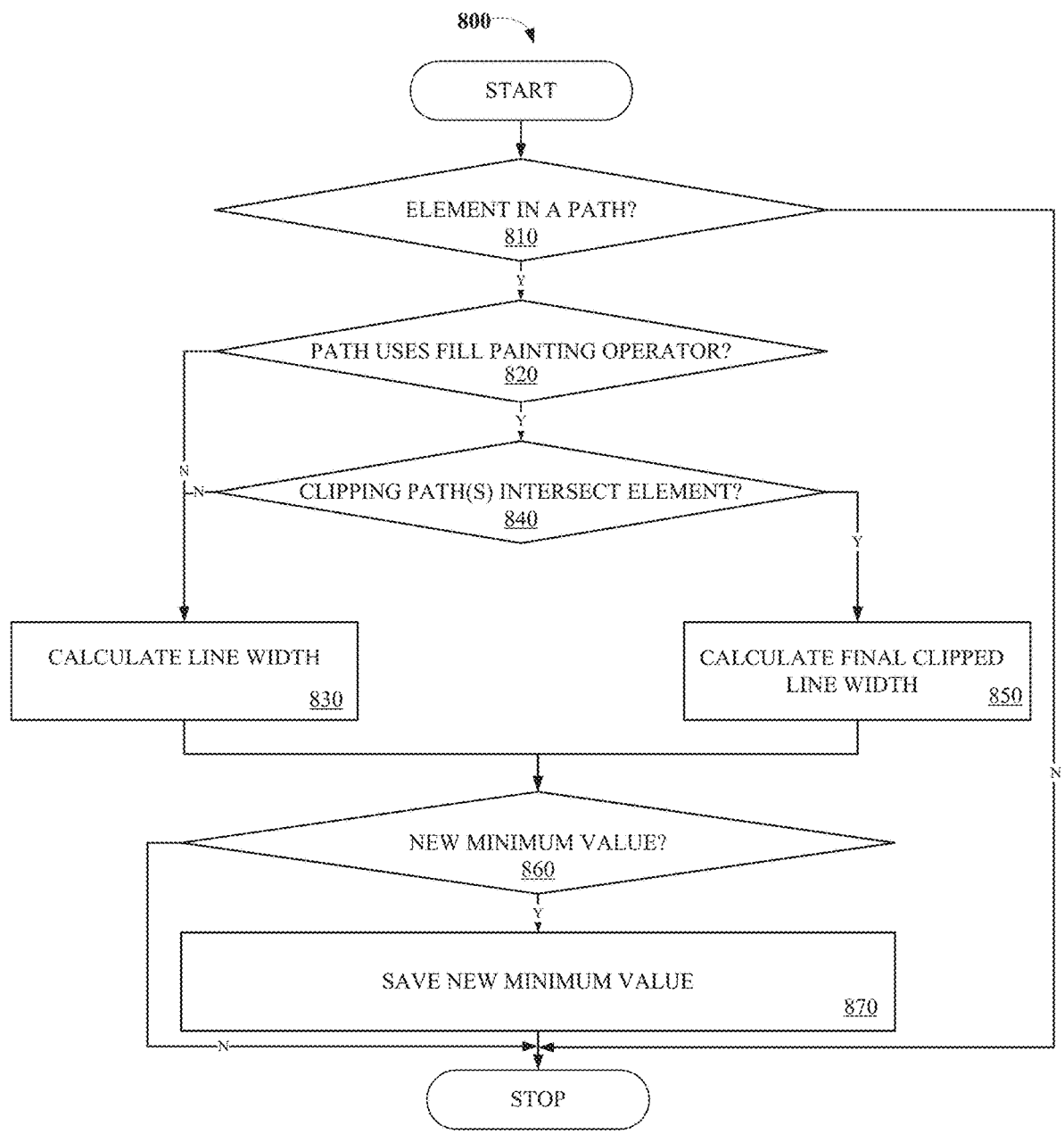
FIG. 8 is a flow diagram illustrating one embodiment for performing an element evaluation process.

FIG. 8 is a flow diagram illustrating one embodiment of an element evaluation process 800. Process 800 may be performed by processing logic that may include hardware (e.g., circuitry, dedicated logic, programmable logic, microcode, etc.), software such as instructions run on a processing device, or a combination thereof. In one embodiment, process 800 is performed by element evaluation logic 510 at each worker thread 446 prior to rasterization.

At decision block 810, a determination is made as to whether the element being evaluated is within a path. If not, there is no need for additional evaluation of the element and the process has been completed. Otherwise, a determination is made as to whether the path uses a fill painting operator, decision block 820. A width line is calculated, at processing block 830, upon a determination at decision block 820 that the path does not use a fill painting operator. However, a determination is made, at decision block 840, as to whether one or more clipping paths intersect the element upon a determination that the path uses a fill painting operator.

A final clipped line width is calculated, at processing block 850, upon a determination that one or more clipping paths intersect the element. Otherwise, the width line is calculated, processing block 830. At decision block 860, a determination is made as to whether the calculated line width or non-clipped line width comprises a new minimum value. If so, the new minimum value is saved, at processing block 870, along with page information as a part of the print job structure metadata and the process has been completed. A technical benefit to determining if the path uses fill painting is to consider the impact of intersecting page element line art that may produce fine lines due to the intersections. Alternatively, a determination of the presence of fine lines on pages (as will be explained later) may be performed and the results stored as a part of the print job structure metadata.

Referring back to FIG. 7, once the evaluation process has been completed, a determination is made as to whether the evaluated element is the last element on a page, decision block 750. If not, control is returned to processing block 740 where the next element on the page is evaluated. Otherwise, a determination is made as to whether the current page being traversed is the final page in the sub range, decision block 760. If not, control is returned to processing block 720 where the embedded page resources for the next page in the sub range is retrieved. Otherwise, the page element metadata generated from the page element evaluation is transmitted (e.g., to aggregation logic 430) upon a determination that the current page is the final page in the sub range, processing block 770.

Figure 9:
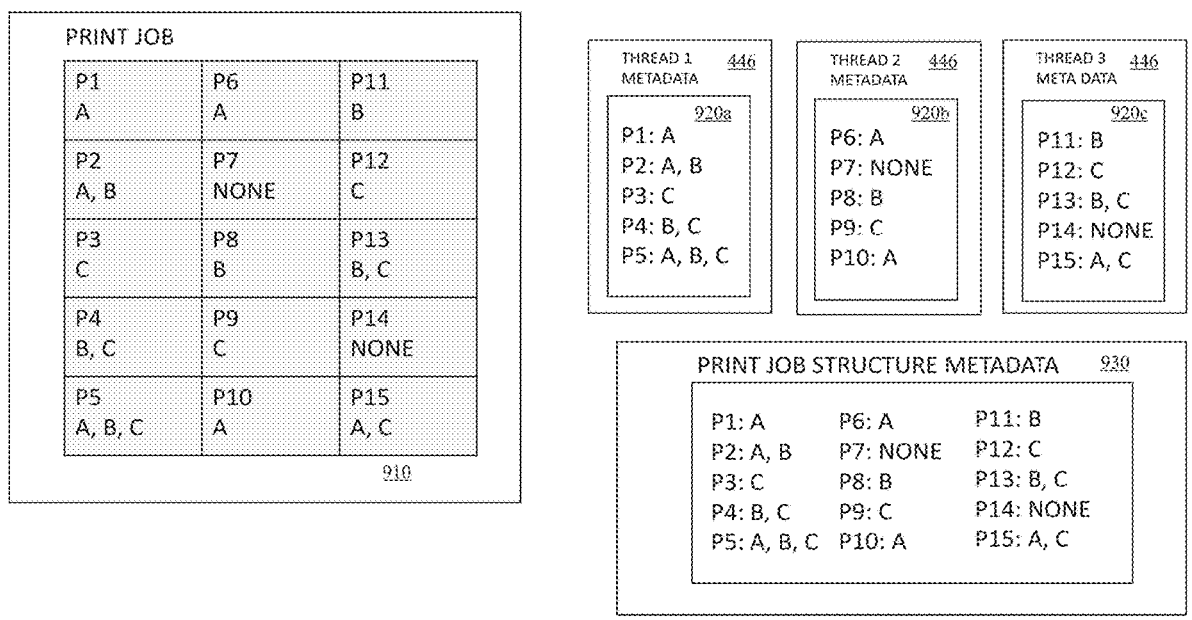
FIG. 9 illustrates one embodiment of print job structure metadata.

As discussed above, aggregation logic 430 uses managing thread 444 to aggregate the page element metadata into print job structure metadata. FIG. 9 illustrates one embodiment of print job structure metadata. As shown in FIG. 9, a print job file 910 includes fifteen pages (P1-P15) each, except for P7 and P14, including page elements (e.g., A, B and C). In this embodiment, there are three worker threads 446 (Thread 1-Thread 3) to process three sub ranges (e.g., P1-P5, P6-P10, P11-P15) to traverse the fifteen pages. Each thread generates page element metadata 920 (e.g., 920*a*, 920*b* and 920*c*). Print job structure metadata 930 comprises an aggregation of the page element metadata 920 generated at Thread 1-Thread 3.

As discussed above, interpreter module 312 retrieves the print job structure metadata 930 and uses the print job structure metadata 930 to process (e.g., interpret and rasterize) the print job file 910 to generate bitmaps 150 at print time. A technical benefit for processing (e.g., generating bitmaps 150) based on print job file 910 and print job structure metadata file 930 at print time is that the print controller 140 processes the corresponding print job file with the page elements and corresponding pages already identified. This saves the print controller 140 the computational burden of additional traversals of the corresponding print job that would otherwise be necessary. In one embodiment, the print job structure metadata identifies logical pages of the print job file to the RIP to enable or not enable center scan or over scan conversion. In another embodiment, the one or more processors use the print job structure metadata as conditional processing control data input (e.g., the presence of fine lines) to the RIP for the logical pages of the print job file.

Figure 10:
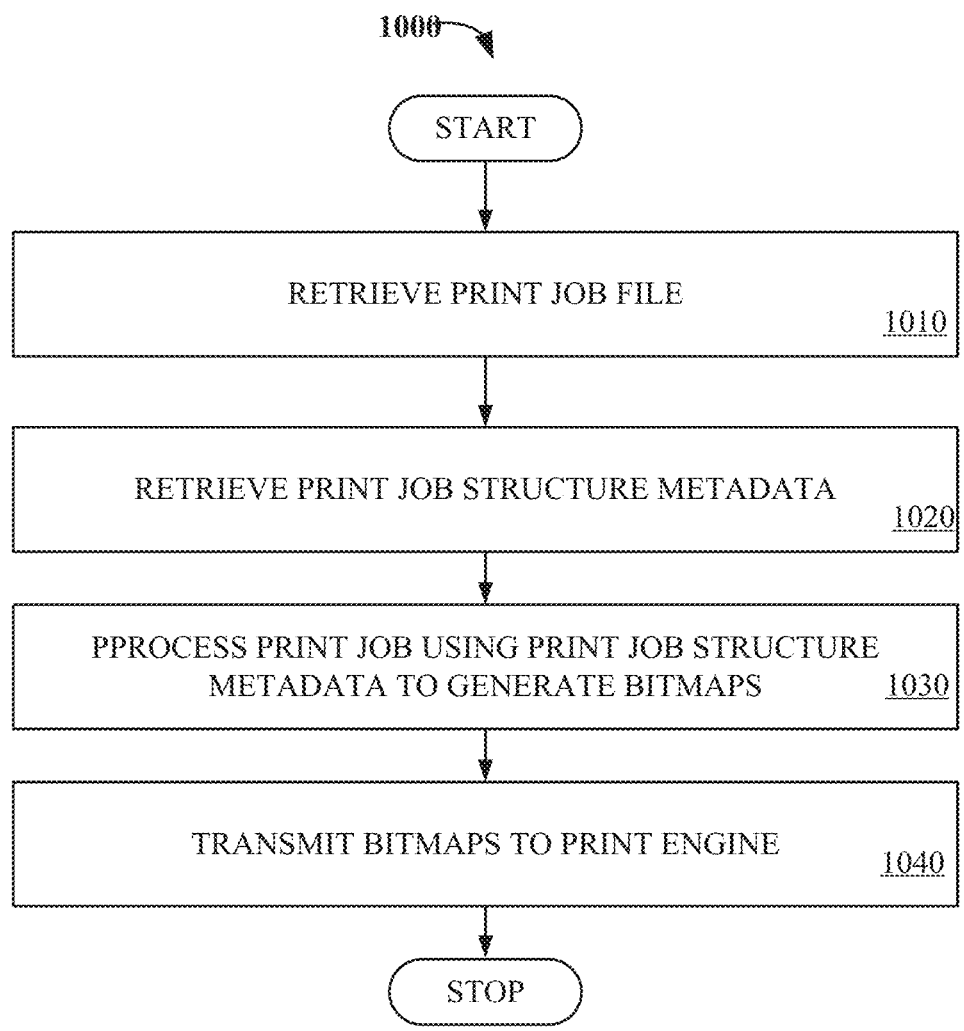
FIG. 10 is a flow diagram illustrating one embodiment of processing a print job file.

FIG. 10 is a flow diagram illustrating one embodiment of a process 1000. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by interpreter 312.

At processing block 1010, a print job file is retrieved. At processing block 1020, the print job structure metadata is retrieved. At processing block 1130, the print job file is processed using print job structure metadata to generate bitmaps. At processing block 1040, the bitmaps are transmitted to the print engine.

Figure 11:
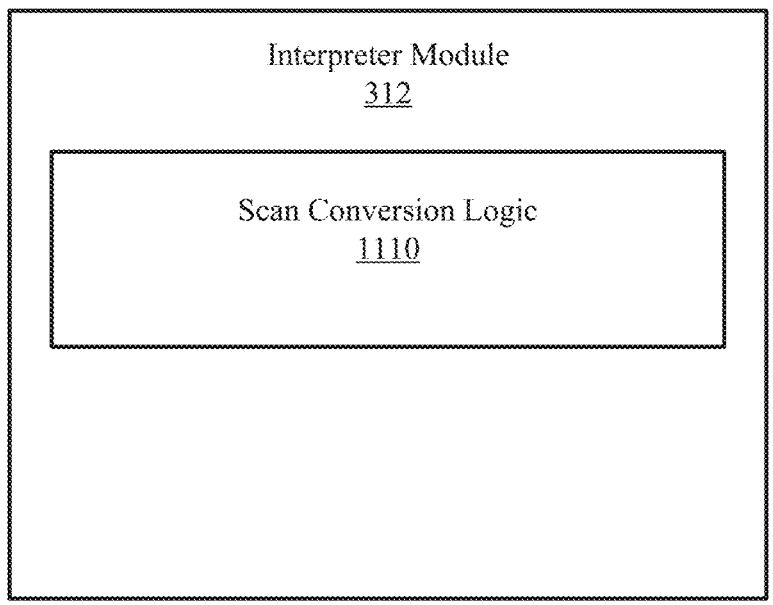
FIG. 11 illustrates one embodiment of an interpreter module.

FIG. 11 illustrates one embodiment of an interpreter module 312 including scan conversion logic 1110. Scan conversion logic 1110 uses the print job structure metadata 930 to determine which scan conversion rule to use while rasterizing page elements in print job file 910. In one embodiment, center scan conversion is enabled for pages that are eligible and would benefit from such conversion. Otherwise, center scan conversion is disabled and overscan conversion is implemented.

Figure 12:
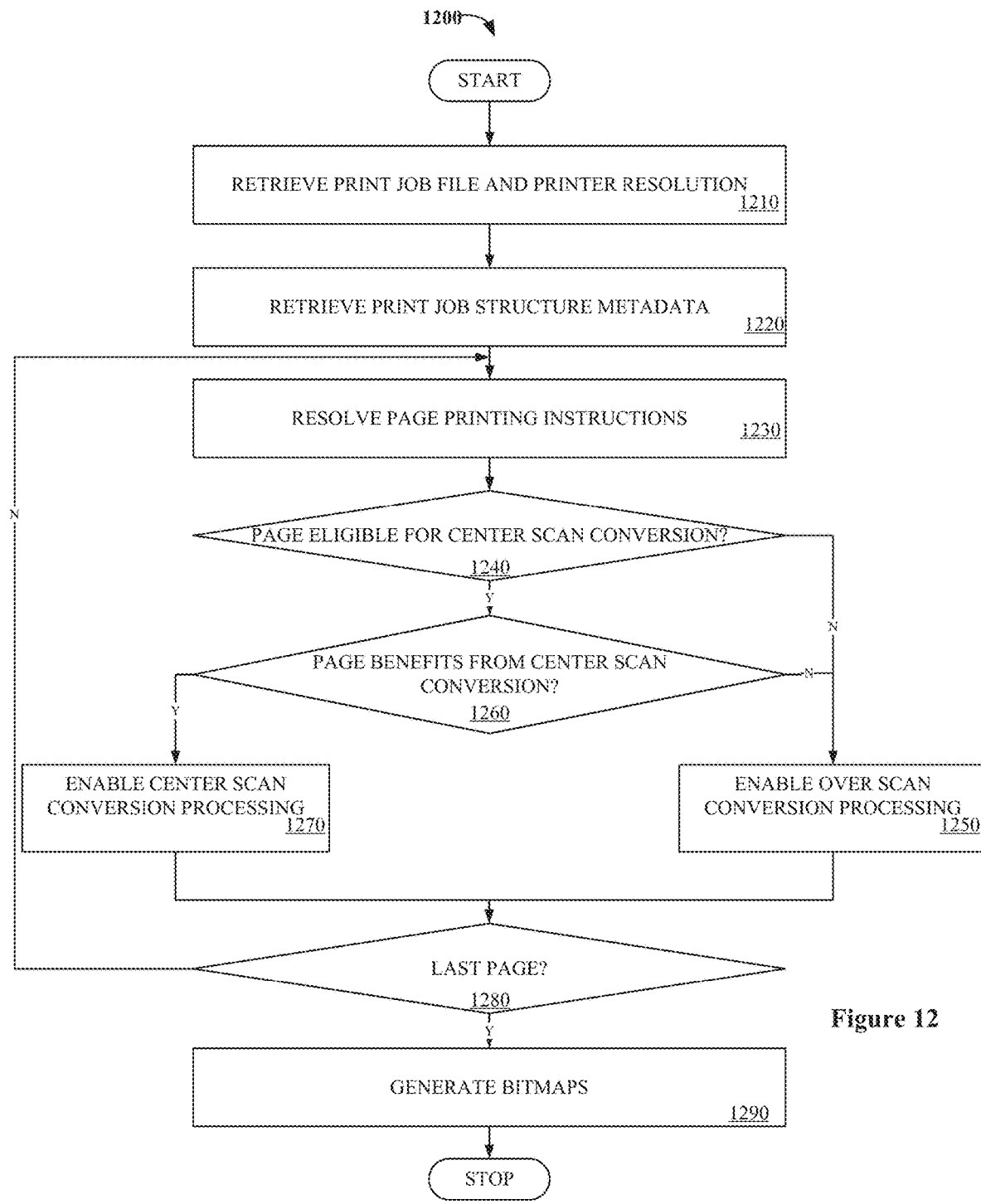
FIG. 12 is a flow diagram illustrating one embodiment of a process performed by an interpreter module.

FIG. 12 is a flow diagram illustrating one embodiment of a scan conversion process 1200. Process 1200 may be performed by processing logic that may include hardware (e.g., circuitry, dedicated logic, programmable logic, microcode, etc.), software such as instructions run on a processing device, or a combination thereof. In one embodiment, process 1200 is performed by interpreter 312.

At processing block 1210, the print job file and printer resolution is received, processing block 1210. At processing block 1220, the print job structure metadata is retrieved. At processing block 1230, printing instructions for a page are resolved based on the printer resolution. At decision block 1240, a determination is made, using the print job structure metadata, as to whether the page is eligible for center scan conversion (e.g., Determine if the page contains a page element that is subject to a known rasterization limitation such as causing the fine lines to be erased due to fill with clipping paths lines that causes an artificial fine line).

Over scan conversion processing is enabled upon a determination that the page is not eligible, processing block 1250. In this case, over scan conversion is implemented. However, a determination is made as to whether the page benefits from center scan conversion upon determining that the page is eligible, decision block 1260. As stated above, pages including fine lines benefit from center scan conversion processing and other pages do not. Fine lines are detected prior to rasterization by comparing the calculated line width (e.g., the line width minimum value) to one or more line width thresholds. Center scan conversion processing is enabled, at processing block 1270, upon a determination that the page does benefit. However, center scan conversion is again disabled, at processing block 1250, upon a determination that the page does not benefit. At decision block 1280, a determination is made as to whether the current page is the last page in the print job file. If not, control is returned to processing block 1230 where page printing instructions are resolved for the next page. Otherwise, print processing may be performed to generate bitmaps 150 as explained above, processing block 1290.

Figure 13:
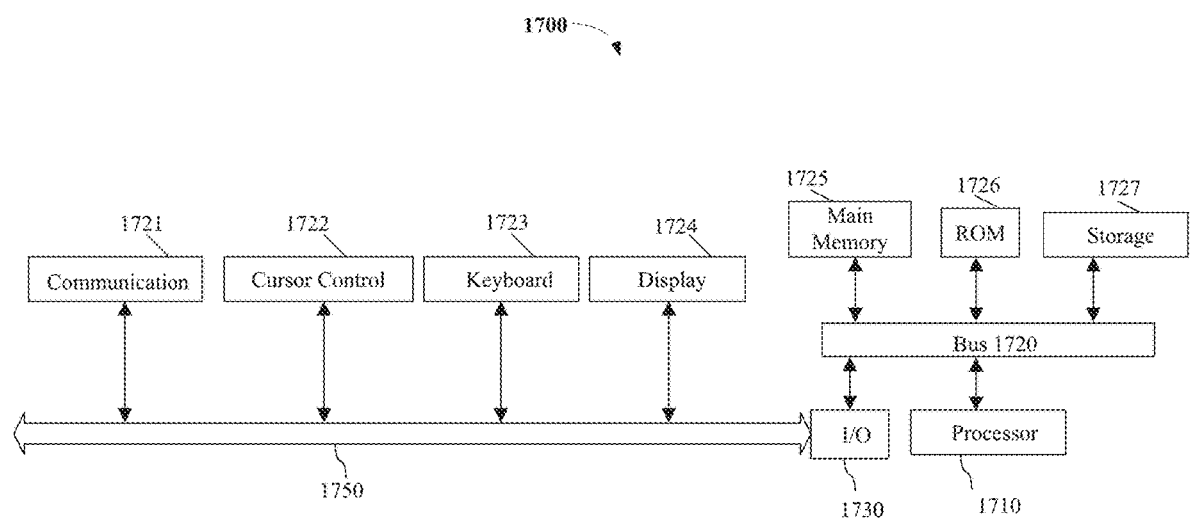
FIG. 13 illustrates one embodiment of a computer system.

FIG. 13 illustrates a computer system 1700 on which printing system 130 and/or compensation module 216 may be implemented. Computer system 1700 includes a system bus 1720 for communicating information, and a processor 1710 coupled to bus 1720 for processing information.

Computer system 1700 further comprises a random-access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710. Computer system 1700 also may include a read only memory (ROM) and or other static storage device 1726 coupled to bus 1720 for storing static information and instructions used by processor 1710.

A data storage device 1727 such as a magnetic disk or optical disc and its corresponding drive may also be coupled to computer system 1700 for storing information and instructions. Computer system 1700 can also be coupled to a second I/O bus 1750 via an I/O interface 1730. A plurality of I/O devices may be coupled to I/O bus 1750, including a display device 1724, an input device (e.g., an alphanumeric input device 1723 and or a cursor control device 1722). The communication device 1721 is for accessing other computers (servers or clients). The communication device 1721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising one or more processors to receive a print job file including page content data, traverse each of a plurality of subset ranges of the page content data to generate page element metadata based on the page content data, wherein the page element metadata comprises identified page elements and the logical pages that correspond to the identified page elements, aggregate the page element metadata to generate print job structure metadata and store the print job structure metadata, wherein the print job structure metadata is stored separately from the print job file.

Example 2 includes the subject matter of Example 1, wherein generating the page element metadata comprises evaluating page elements within the page content data to identify associated logical pages of the print job file having markings instructed by the page elements.

Example 3 includes the subject matter of Examples 1 and 2, wherein generating the page element metadata further comprises determining properties of the page elements.

Example 4 includes the subject matter of Examples 1-3, wherein generating the page element metadata further comprises determining a presence of fine lines based on properties of the page elements that determine line width.

Example 5 includes the subject matter of Examples 1-4, wherein determining the presence of fine lines comprises determining line widths and a line width comparison of the determined line widths to one or more line width thresholds.

Example 6 includes the subject matter of Examples 1-5, wherein determining the presence of fine lines further comprises determining whether the page elements comprise a fill painting operator and applying a clipping path intersection evaluation prior to performing the line width comparison upon a determination that the page elements comprise a fill painting operator.

Example 7 includes the subject matter of Examples 1-6, wherein traversing each of the plurality of subset ranges comprises determining a quantity of processes to process the print job file, assigning a process to each of the plurality of subset ranges and generating the page element metadata at each of the plurality of subset ranges.

Example 8 includes the subject matter of Examples 1-7, wherein traversing each of the plurality of subset ranges further comprises assigning a subset range identifier (ID) to each of the plurality of subset ranges prior to assigning the processes to each of the plurality of subset ranges.

Example 9 includes the subject matter of Examples 1-8, wherein the plurality of subset ranges are traversed by the processes in parallel.

Example 10 includes the subject matter of Examples 1-9, wherein the one or more processors receive the page element metadata at a managing process from each of the worker processes as the print job structure metadata.

Example 11 includes the subject matter of Examples 1-10, wherein the one or more processors to retrieve the stored print job structure metadata and perform processing the print job file using the print job structure metadata to generate bitmaps.

Example 12 includes the subject matter of Examples 1-11, wherein the print job structure metadata identifies logical pages of the print job file to the RIP to enable center scan conversion or overscan conversion.

Example 13 includes the subject matter of Examples 1-12, wherein the one or more processors use the print job structure metadata as conditional processing control data input to the RIP for the logical pages of the print job file.

Example 14 includes the subject matter of Examples 1-13, wherein the print job structure metadata includes determinations on a presence of fine lines on each of the logical pages.

Example 15 includes the subject matter of Examples 1-14, further comprising one or more print engines.

Some embodiments pertain to Example 16 that includes a method comprising receiving a print job file including page content data, traversing each of a plurality of subset ranges of the page content data to generate page element metadata based on the page content data, wherein the page element metadata comprises identified page elements and the logical pages that correspond to the identified page elements, aggregating the page element metadata to generate print job structure metadata and storing the print job structure metadata, wherein the print job structure metadata is stored separately from the print job file.

Example 17 includes the subject matter of Example 16, wherein generating the page element metadata comprises evaluating page elements within the page content data to identify associated logical pages of the print job file having markings instructed by the page elements, determining properties of the page elements and determining a presence of fine lines based on properties of the page elements that determine line width.

Example 18 includes the subject matter of Examples 16 and 17, wherein determining the presence of fine lines comprises determining line widths and a line width comparison of the determined line widths to one or more line width thresholds, determining whether the page elements comprise a fill painting operator and applying a clipping path intersection evaluation prior to performing the line width comparison upon a determination that the page elements comprise a fill painting operator.

Example 19 includes the subject matter of Examples 16-18, wherein traversing each of the plurality of subset ranges comprises determining a quantity of processes to process the print job file, assigning a process to each of the plurality of subset ranges and generating the page element metadata at each of the plurality of subset ranges.

Some embodiments pertain to Example 20 that includes at least one computer readable medium having instructions stored thereon, which when executed by one or more processors, cause the processors to receive a print job file including page content data, traverse each of a plurality of subset ranges of the page content data to generate page element metadata based on the page content data, wherein the page element metadata comprises identified page elements and the logical pages that correspond to the identified page elements, aggregate the page element metadata to generate print job structure metadata and store the print job structure metadata, wherein the print job structure metadata is stored separately from the print job file.

Example 21 includes the subject matter of Example 20, wherein generating the page element metadata comprises evaluating page elements within the page content data to identify associated logical pages of the print job file having markings instructed by the page elements, determining properties of the page elements and determining a presence of fine lines based on properties of the page elements that determine line width.

Example 22 includes the subject matter of Examples 20 and 21, wherein determining the presence of fine lines comprises determining line widths and a line width comparison of the determined line widths to one or more line width thresholds, determining whether the page elements comprise a fill painting operator and applying a clipping path intersection evaluation prior to performing the line width comparison upon a determination that the page elements comprise a fill painting operator.

Example 23 includes the subject matter of Examples 20-22, wherein traversing each of the plurality of subset ranges comprises determining a quantity of processes to process the print job file, assigning a process to each of the plurality of subset ranges and generating the page element metadata at each of the plurality of subset ranges.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising one or more processors to:
receive a print job file including page content data;
traverse each of a plurality of subset ranges of the page content data to generate page element metadata based on the page content data, wherein the page element metadata comprises identified page elements and logical pages that correspond to the identified page elements and page elements comprise operator and operand objects in the print job file that control line art; and
aggregate the page element metadata to generate print job structure metadata, wherein the print job structure metadata identifies logical pages of the print job file to a RIP to enable center scan conversion or overscan conversion.

2. The system of claim 1, wherein generating the page element metadata comprises evaluating the page elements within the page content data to identify associated logical pages of the print job file having markings instructed by the page elements.

3. The system of claim 2, wherein generating the page element metadata further comprises determining properties of the page elements.

4. The system of claim 3, wherein generating the page element metadata further comprises determining a presence of fine lines based on the properties of the page elements that determine line width.

5. The system of claim 4, wherein determining the presence of the fine lines comprises determining line widths and a line width comparison of the determined line widths to one or more line width thresholds.

6. The system of claim 5, wherein determining the presence of the fine lines further comprises determining whether the page elements comprise a fill painting operator and applying a clipping path intersection evaluation prior to performing the line width comparison upon a determination that the page elements comprise the fill painting operator.

7. The system of claim 1, wherein traversing each of the plurality of subset ranges comprises determining a quantity of processes to process the print job file, assigning a process to each of the plurality of subset ranges and generating the page element metadata at each of the plurality of subset ranges.

8. The system of claim 1, wherein traversing each of the plurality of subset ranges further comprises assigning a subset range identifier (ID) to each of the plurality of subset ranges prior to assigning processes to each of the plurality of subset ranges.

9. The system of claim 8, wherein the plurality of subset ranges are traversed by the processes in parallel.

10. The system of claim 9, wherein the one or more processors receive the page element metadata at a managing process from worker processes as the print job structure metadata.

11. The system of claim 1, wherein the one or more processors to retrieve the print job structure metadata and perform processing the print job file using the print job structure metadata to generate bitmaps.

12. The system of claim 1, wherein the one or more processors to store the print job structure metadata separately from the print job file.

13. The system of claim 12, wherein the one or more processors use the print job structure metadata as conditional processing control data input to the RIP for the logical pages of the print job file.

14. The system of claim 1, wherein the print job structure metadata includes determinations on a presence of fine lines on each of the logical pages.

15. The system of claim 1, further comprising one or more print engines.

16. A method comprising:
receiving a print job file including page content data;
traversing each of a plurality of subset ranges of the page content data to generate page element metadata based on the page content data, wherein the page element metadata comprises identified page elements and logical pages that correspond to the identified page elements and page elements comprise operator and operand objects in the print job file that control line art; and
aggregating the page element metadata to generate print job structure metadata, wherein the print job structure metadata identifies logical pages of the print job file to a RIP to enable center scan conversion or overscan conversion.

17. The method of claim 16, wherein generating the page element metadata comprises:
evaluating the page elements within the page content data to identify associated logical pages of the print job file having markings instructed by the page elements;
determining properties of the page elements; and
determining a presence of fine lines based on the properties of the page elements that determine line width.

18. The method of claim 17, wherein determining the presence of the fine lines comprises:
determining line widths and a line width comparison of the determined line widths to one or more line width thresholds;
determining whether the page elements comprise a fill painting operator; and
applying a clipping path intersection evaluation prior to performing the line width comparison upon a determination that the page elements comprise the fill painting operator.

19. The method of claim 16, wherein traversing each of the plurality of subset ranges comprises:
determining a quantity of processes to process the print job file;
assigning a process to each of the plurality of subset ranges; and
generating the page element metadata at each of the plurality of subset ranges.

20. At least one non-transitory computer readable medium having instructions stored thereon, which when executed by one or more processors, cause the processors to:
receive a print job file including page content data;
traverse each of a plurality of subset ranges of the page content data to generate page element metadata based on the page content data, wherein the page element metadata comprises identified page elements and logical pages that correspond to the identified page elements and page elements comprise operator and operand objects in the print job file that control line art; and
aggregate the page element metadata to generate print job structure metadata, wherein the print job structure metadata identifies logical pages of the print job file to a RIP to enable center scan conversion or overscan conversion.

21. The computer readable medium of claim 20, wherein generating the page element metadata comprises:
evaluating the page elements within the page content data to identify associated logical pages of the print job file having markings instructed by the page elements;
determining properties of the page elements; and
determining a presence of fine lines based on the properties of the page elements that determine line width.

22. The computer readable medium of claim 21, wherein determining the presence of the fine lines comprises:
determining line widths and a line width comparison of the determined line widths to one or more line width thresholds;
determining whether the page elements comprise a fill painting operator; and
applying a clipping path intersection evaluation prior to performing the line width comparison upon a determination that the page elements comprise the fill painting operator.

23. The computer readable medium of claim 20, wherein traversing each of the plurality of the subset ranges comprises:
determining a quantity of processes to process the print job file;
assigning a process to each of the plurality of subset ranges; and
generating the page element metadata at each of the plurality of subset ranges.

* * * * *